G. W. BANKS.
COTTON-CHOPPER.

No. 191,219. Patented May 29, 1877.

WITNESSES
Wm Garner
Albert J. de Puy

INVENTOR
G. W. Banks
per
F. A. Lehmann,
atty.

N. PETERS, PHOTO-LITHOGRAPHER, WASHINGTON, D. C.

UNITED STATES PATENT OFFICE.

GEORGE W. BANKS, OF HARDIN COUNTY, TENNESSEE.

IMPROVEMENT IN COTTON-CHOPPERS.

Specification forming part of Letters Patent No. 191,219, dated May 29, 1877; application filed April 18, 1877.

*To all whom it may concern:*

Be it known that I, GEORGE W. BANKS, of the county of Hardin and State of Tennessee, have invented certain new and useful Improvements in Cotton-Chopper; and I do hereby declare the following to be a full, clear, and exact description of the invention, such as will enable others skilled in the art to which it pertains to make and use it, reference being had to the accompanying drawings, which form part of this specification.

My invention relates to an improvement in cotton choppers and cultivators; and it consists in the arrangement and combination of parts, that will be more fully described hereinafter, whereby the cotton is scraped, cultivated, and chopped at the same time, or each operation can be performed separately.

Figure 1:
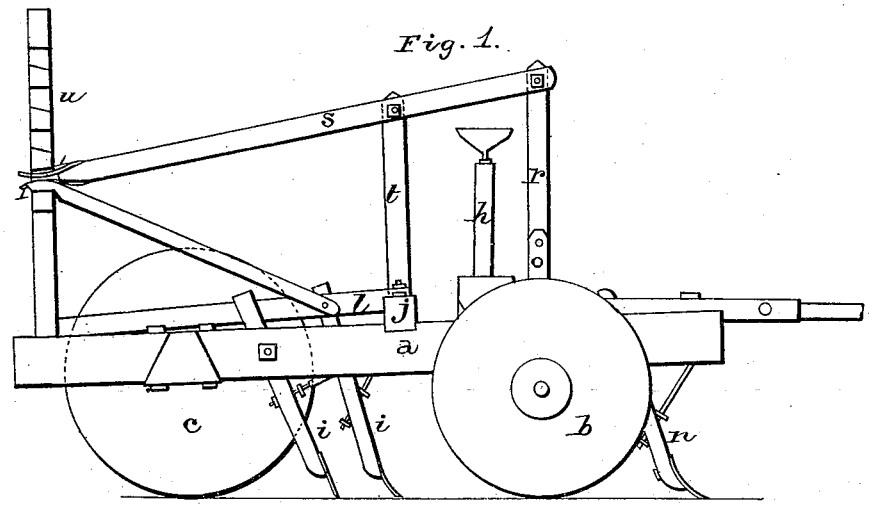
Figure 2:
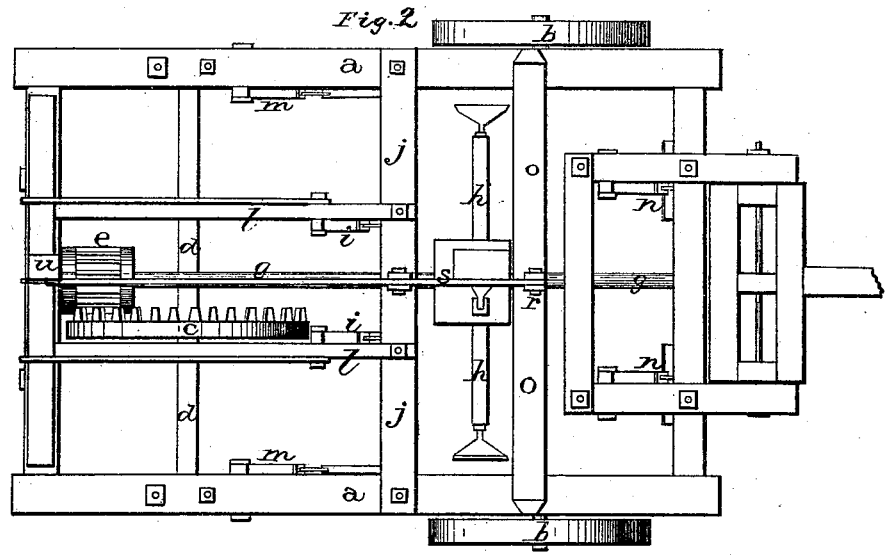
Figure 3:
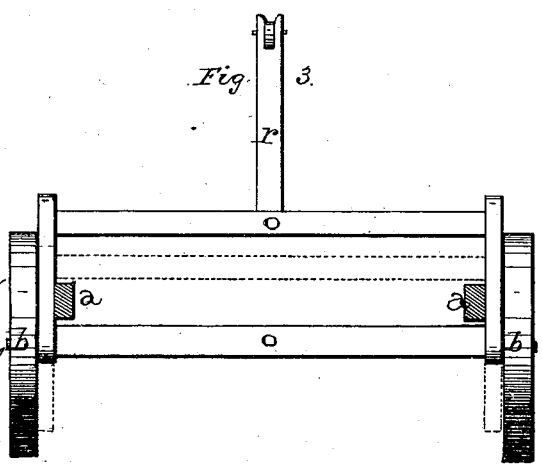

Figure 1 is a side elevation of my invention. Fig. 2 is a plan of the same. Fig. 3 is a transverse sectional view.

$a$ represents a rectangular frame, which is supported at its front end by the wheels $b$, and at its rear end by the toothed wheel $c$. This wheel $c$ is placed upon the axle $d$, and communicates motion to the pinion $e$, placed on the shaft $g$, that runs the full length of the machine. Secured to this shaft, a little in advance of the center of the frame, is the chopper $h$, which is provided with suitable cutting-hoes, which hoes have screw-shanks, so that they can be adjusted in and out, as occasion may require.

From the cross-beam $j$, that extends across the center of the frame, extend the two braces or beams $l$; and to the sides of these braces are secured the two cultivators $i$, which are just far enough apart to run on both sides of the row. These cultivators, as well as the scrapers and plows, are provided with suitable jointed adjustable braces, that are united together by means of wooden brake-pins.

To the insides of the frame $a$, slightly in the rear of the cultivators, are secured the plows $m$. To the front end of the frame, so as to come on each side of the row, are the scrapers $n$, for cutting away the weeds and grass.

In order to regulate the depth at which the scrapers, choppers, cultivators, and plows shall run, the two wheels $b$ are secured to the sash $o$, which is dovetailed in the outer side of the frame, and made vertically adjustable. From the top of this sash rises the standard $r$, to the upper end of which is pivoted the lever $s$, which lever has its fulcrum on the top of the standard $t$, and has the two springs 1 in its rear end, for catching in the notches in the side of the post $u$.

By pressing down upon the rear end of the lever the sash is drawn upward through the frame, and the frame sinks downward; and by elevating the rear end of the lever the frame is raised upward. In order to accommodate the tongue to these movements, it is pivoted to the front of the frame.

Having thus described my invention, I claim—

The combination of the frame $a$, supported at its rear end by the gear-wheel $c$, and at its front end by the wheels $b$, which are attached to the sash $o$, the standard $r$, lever $s$, and notched standard $u$, the lever being provided with the two springs 1, for the purpose of holding the front of the frame at any desired height, all the parts being arranged to operate substantially as shown.

In testimony that I claim the foregoing I have hereunto set my hand this 4th day of April, 1877.

GEORGE WASHINGTON BANKS.

Witnesses:
 R. W. FOSTER,
 ENOS MONROE FOSTER.